Jan. 14, 1964
E. J. HAUSER ETAL
3,117,793
ROTARY FACE TYPE SEAL
Filed Oct. 26, 1960
3 Sheets-Sheet 1
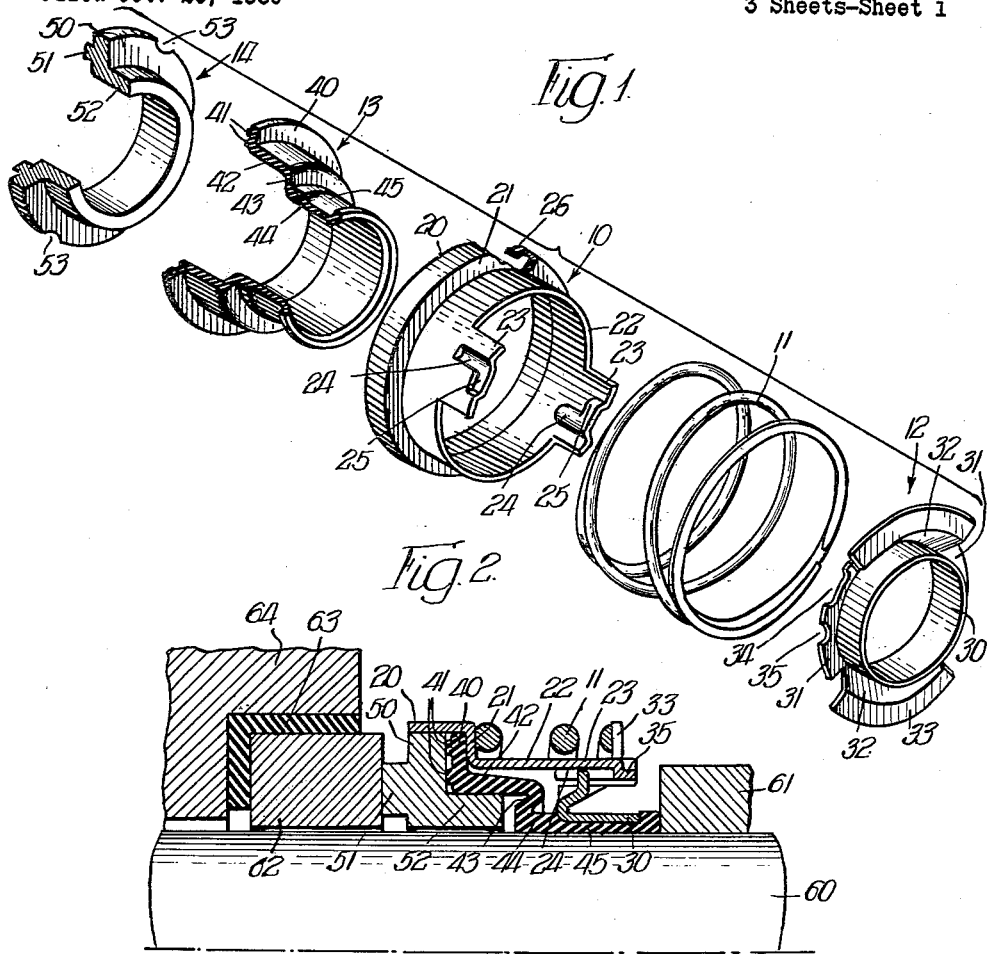
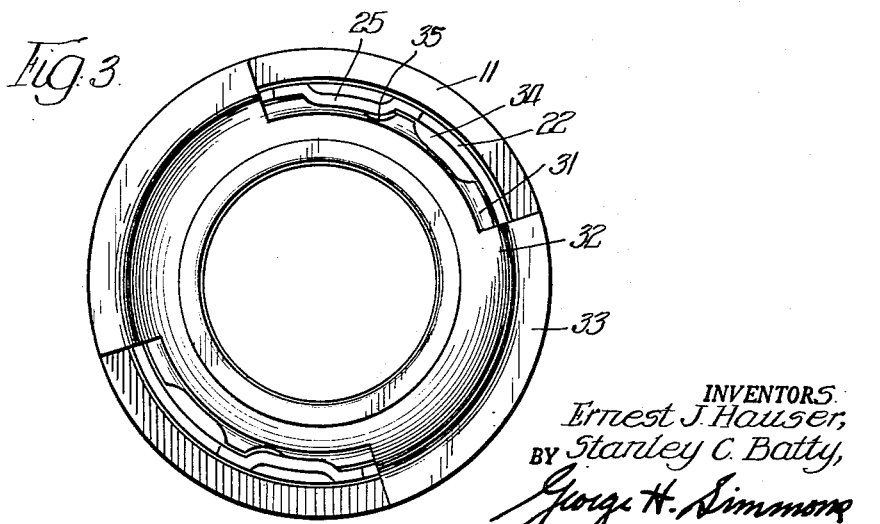
INVENTORS
Ernest J. Hauser,
BY Stanley C. Batty,
George H. Simmons
atty.

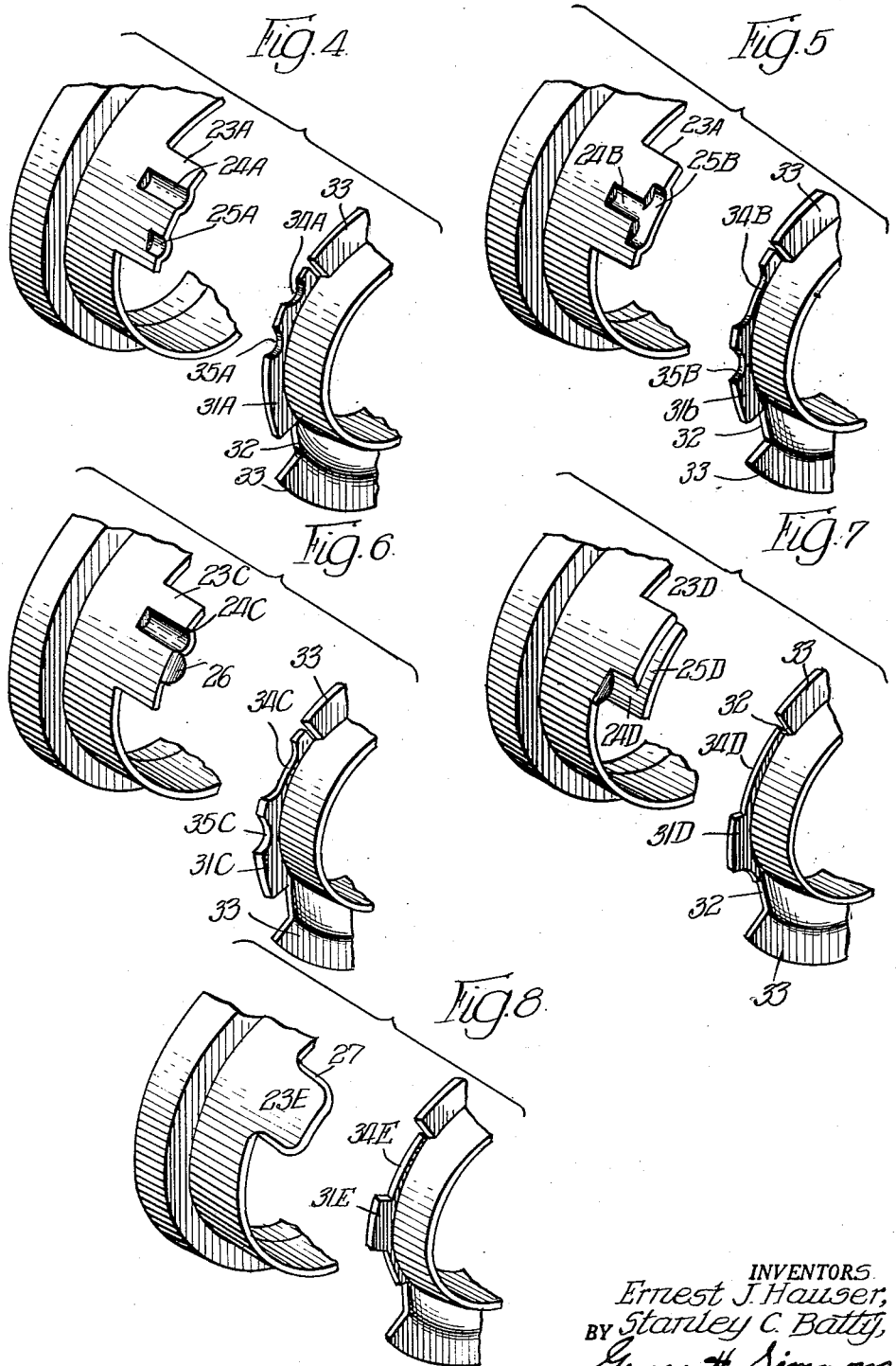

Jan. 14, 1964  E. J. HAUSER ETAL  3,117,793
ROTARY FACE TYPE SEAL
Filed Oct. 26, 1960  3 Sheets-Sheet 3
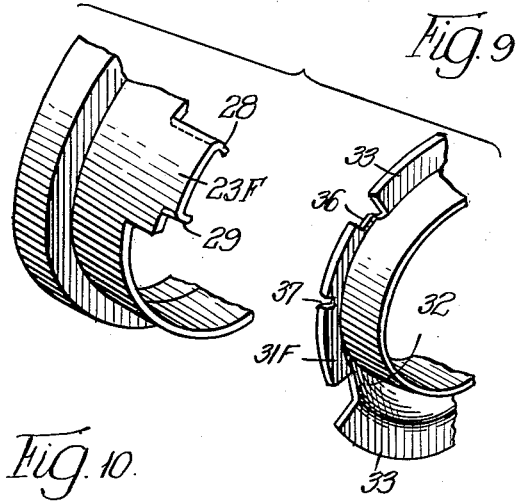
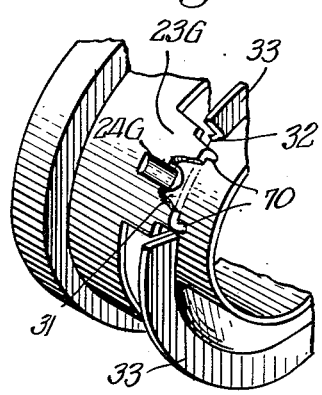
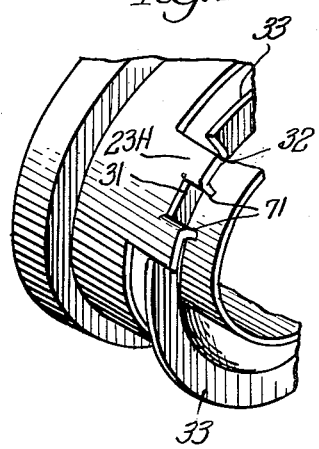
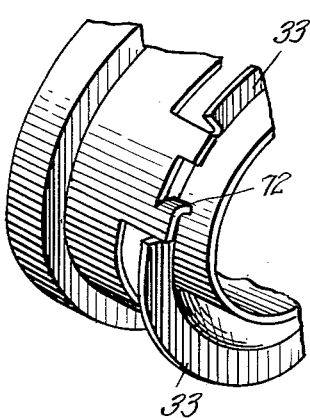
INVENTORS
Ernest J. Hauser,
BY Stanley C. Batty
George H. Simmons
ATTY United States Patent Office 3,117,793
Patented Jan. 14, 1964

3,117,793
ROTARY FACE TYPE SEAL
Ernest J. Hauser, Elmhurst, and Stanley C. Batty, Melrose Park, Ill., assignors to Victor Manufacturing & Gasket Company, Chicago, Ill., a corporation of Illinois
Filed Oct. 26, 1960, Ser. No. 65,142
13 Claims. (Cl. 277—36)

This invention relates to rotary face type seals and has for its principal object the provision of a new and improved seal of this type.

It is a main object of the invention to provide a self-contained rotary face type seal that can be mounted upon a shaft in a small space, axially and radially, and having a seal ring that is positively driven by the shaft by revolution thereof in both directions, which seal ring is maintained in seal-forming engagement with a stationary mating member by a spring that is contained in the unitary device.

Another object of the invention is to provide, in a self-contained rotary face type seal, a spring cage that can be assembled as a unitary structure without the use of tools, jigs or fixtures, in which structure the spring is preloaded to a predetermined amount during assembly of the cage.

Another object of the invention is to provide in a self-contained rotary face type seal, a spring cage consisting of a casing, a helical spring, and a torque sleeve, which casing and sleeve are held together with the spring compressed therebetween by interengaged means which also provide positive drive of the casing by the sleeve in both directions of rotation.

Another object of the invention is to provide, in a self-contained rotary face type seal, a spring cage in which an elastomer diaphragm is secured without cementing, bending, staking, or otherwise deforming the spring cage during assembly, and in which a seal ring is secured in the diaphragm without the use of cement or the like.

Still another object of the invention is to provide a self-contained rotary face type seal in which torque is transmitted by a shaft through an elastomer diaphragm to a torque sleeve and transmitted by the torque sleeve to a casing through interengaged means thereon and is transmitted by the casing to a seal ring through interengaged means thereon.

Another object of the invention is to provide a self-containing rotary seal which can be manufactured at low cost without sacrificing quality.

Further objects of the invention, not specifically mentioned here, will be apparent from the detailed description and claims which follow, reference being had to the accompanying drawings in which a preferred embodiment of the invention is shown by way of example and in which:

FIG. 1 is an exploded view of a preferred embodiment of the invention;

FIG. 2 is a cross sectional view of the seal of FIG. 1, installed in operating position;

FIG. 3 is a rear end view of the seal of FIG. 1;

FIG. 4 is a fragmentary view showing a modification of the seal embodying the features of the seal shown in FIG. 1;

FIG. 5 is a view similar to FIG. 4, showing another modification;

FIG. 6 is a view similar to FIG. 4, showing a further modification;

FIG. 7 is a view similar to FIG. 4, showing still another modification;

FIG. 8 is a view similar to FIG. 4, showing a still further modification;

FIG. 9 is a view also similar to FIG. 4, showing still another modification;

FIG. 10 is a fragmentary view showing a seal embodying features different from those of the seal shown in FIG. 1;

FIG. 11 is a view similar to FIG. 10, showing a modification of the seal shown in FIG. 10; and FIG. 12 is a view similar to FIG. 11, showing another modification of the seal shown in FIG. 10.

The sealing device of the present invention is a face type seal adapted for mounting upon a shaft so as to be rotatable therewith, the seal containing a spring through the operation of which the sealing ring is maintained in seal-forming engagement with a mating member.

In its preferred form, the sealing device of the present invention consists of three main parts, namely: a spring cage, an elastomer diaphragm, and a seal ring. The spring cage consists of a metallic casing, a helical spring, and a torque sleeve, the spring being abutted between the casing and torque sleeve and compressed thereby to preload the spring to a desired amount. Interengaged means on the casing and torque sleeve hold the spring case together as a unit and provide positive drive between the torque sleeve and casing during rotations of the shaft in both directions. The interengaged means permits axial movement of the casing with respect to the torque sleeve.

The elastomer diaphragm is fitted into the casing and extended therefrom into the torque sleeve, the diaphragm being provided with an outwardly opening groove that registers with a cylindrical clamping band portion of the torque sleeve. The diaphragm is not fastened in the spring cage by cementing.

The seal ring fits in the casing and diaphragm in securing and seal-forming relation thereto. It is not necessary to cement or otherwise secure the seal ring in the diaphragm. Interengaged means on the casing and seal ring provide for positive drive of the seal ring by the casing.

Referring now to the drawings in more detail, from FIG. 1 it will be seen that the device consists of a casing 10, a helical spring 11, a torque sleeve 12, an elastomer diaphragm 13, and a seal ring 14.

The casing 10 consists of an outer cylindrical portion 20 from the rear end of which a radial wall 21 projects inwardly. Projecting rearwardly from the inner edge of the radial wall 21 is an inner cylindrical portion 22 from the distal end of which tongues 23 project rearwardly.

The torque sleeve 12 consists of a cylindrical clamping ring 30, from the forward end of which are projected radial flanges 31, shown to be two in number, spaced diametrically opposite each other and dimensioned to fit within the cylindrical portion 22 of the shell. Also projected from the forward end of the ring 30 are frusto-conical flanges 32 which extend outwardly and rearwardly therefrom. Radially extending outer flanges 33 project from the distal ends of the frusto-conical flanges 32.

In the embodiment of the invention shown in FIGS. 1, 2 and 3, the interengaged means by which the spring cage is held together consists of inwardly extending axially disposed bosses 24 that extend from end-to-end of the tongues 23. At the distal ends of the tongues are laterally extending bosses 25. The radial flanges 31 of the torque sleeve contain wide grooves 34 and narrow grooves 35, which grooves are spaced apart.

In assembling the spring cage, the coil spring 11 is telescoped over the cylindrical portion 22 of the casing and abutted against the radial portion 21 thereof. The torque sleeve is fitted in the opposite end of the spring, with the outer flanges 33 engaging the ends of the spring. The torque sleeve is then rotated to register the grooves 34 therein with the bosses 24 and 25 of the casing, and the torque sleeve is then moved axially to position the flanges 31 forwardly of the forward ends of the bosses 24. The torque sleeve is then rotated clockwise, as shown in FIG. 1, to move the grooves 35 into registration with the bosses 24. Pressure is then released and the spring moves the torque sleeve rearwardly, bringing the flanges 31 into engagement with the forward surfaces of the laterally extending bosses 25, thereby to secure the spring cage together as a unit. With the flanges 31 engaging the bosses 24, spring 11 is maintained under some compression, thereby to preload the spring to a desired amount.

It will be noted that the assembling of the spring cage, as thus described, is accomplished without the use of any tools, jigs or fixtures. Since the axially extending bosses 24 are engaged in the grooves 35 in the torque sleeve, positive drive is thus established between the torque sleeve and casing, and at the same time limited axial movements of the torque sleeve and casing are possible.

The elastomer diaphragm consists of a forward radial portion 40 dimensioned to fit within the outer cylindrical portion 20 of the casing. Projecting forwardly from the radial portion 20 of the diaphragm are concentric flutes or lips 41 shown to be two in number. Projecting rearwardly from the inner edge of the radial portion 40 is an outer cylindrical portion 42, and an annular portion 43 is projected radially inwardly from the rearward end of the cylindrical portion 42. An inner cylindrical portion 44 extends rearwardly from the inner edge of the annular portion 43 and is provided with an outwardly opening groove 45. The diaphragm is fitted into the casing 10 and extended rearwardly therefrom into the cylindrical ring 30 of the torque sleeve which fits within the groove 45 in the manner shown in FIG. 2. The inner diameter of the inner cylindrical portion 44 of the diaphragm is slightly less than the diameter of the shaft so that when the seal is installed upon a shaft in the manner shown in FIG. 2 the diaphragm will be compressed between the shaft and ring 30, thereby to form a seal and to transmit torque from the shaft to the torque sleeve.

The seal ring 14 consists of an annular portion 50 from the forward face of which a sealing lip 51 is projected. The sealing face of the sealing lip is lapped to a flatness of a few light bands, as is customary in seals of this kind. Projecting rearwardly from the annular portion 50 is a cylindrical portion 51, the outer diameter of which is dimensioned for pressfit within the cylindrical portion 42 of the diaphragm. The seal ring, which is composed of a suitable low friction material, is pressed into the diaphragm and casing, into the position in which it is shown in FIG. 2. Since the cylindrical portion 52 of the seal ring is of slightly greater diameter than the cylindrical portion 42 of the diaphragm, the diaphragm is stretched somewhat by the insertion of the seal ring therein, thereby to hold the seal ring in the diaphragm and cementing is not necessary. The concentric lips 41 are pressed into seal-forming engagement with the rear radial face of the annular portion 50 of the seal ring.

It will be noted that the outer edge of the annulus 50 of the seal ring contains grooves 53, shown to be two in number, and that the outer cylindrical portion 20 of the casing contains inwardly extending bosses 26 that project over the radial portion 40 of the elastomer diaphragm and into the grooves 53, thereby to provide positive drive between the casing and seal ring. The projection of bosses 26 over the forward edge of the radial portion 40 of the diaphragm holds the diaphragm in the casing 10 and cementing is not necessary.

With the seal thus assembled, the preloading of the spring is retained by the engagement of the flanges 31 and bosses 25 when the device is in relaxed state. Through this arrangement there is no strain upon the elastomer diaphragm and as a result the diaphragm is not deteriorated, even though the sealing device be stored for a considerable period of time before being inserted in a machine.

As will be seen in FIG. 2, when the seal is installed upon the shaft 60, the rear end of the diaphragm is abutted against a shoulder or collar 61 that is fixed upon the shaft. The seal lip 51 of the seal ring engages a mating member 62 that is sealed by suitable means 63 into the housing part 64 through which the shaft projects. As the shaft is rotated, the sealing device is rotated and the mating member remains stationary.

The interengaged means on the torque sleeve and casing by which the spring cage is maintained together as a unit may be varied from the preferred embodiment shown in FIG. 1, within the scope of the present invention, and such modifications are contemplated.

In FIG. 4 we have shown a modification in which the tongues 23A are provided with axially extending bosses 24A as before, and also with a short inwardly projecting boss 25A that is spaced from the boss 24A. The radial flanges 31A of the torque sleeve are each provided with a groove 34A dimensioned to fit over the boss 24A and with a second groove 35A positioned to register with the boss 25A when the groove 34A is registered with the boss 24A. With the casing and torque sleeve thus registered together, the torque sleeve is moved forwardly until the flange 31A clears the forward end of the boss 24A and the torque sleeve is then rotated clockwise, as shown in FIG. 4, to register the groove 35A with the boss 24A. When the pressure is released, the spring (not shown in this figure) moves the torque sleeve rearwardly and flange 31A engages the inner end of the boss 25A to secure the spring cage together as before.

Another modification is shown in FIG. 5, from which it will be seen that the tongues 23B are provided with the axially extending bosses 24B and with a circumferentially extending boss 25B, which bosses together form a T-shaped configuration. The radial flanges 31B of the torque sleeve are equipped with a wide groove 34B adapted to be registered with the bosses 25B and also with a smaller groove 35B. With groove 34B registered with the boss 25B, the torque sleeve is moved forwardly as before and then rotated clockwise, as seen in FIG. 5, to register the groove 35B with the boss 24B. The radial flanges 31B engage the forward ends of the bosses 25B on both sides of the groove 35B to secure the spring cage together, as before.

In FIG. 6, the tongues 23C contain the axially extending bosses 24C as before; however, bosses 25 are replaced by ears 26 which project radially inwardly from the distal end of the tongues. The radial flanges 31C of the torque sleeve are provided with grooves 34C which are wide enough to permit bosses 24C and ears 26 to pass therethrough. Second grooves 35C are also provided, and after the torque sleeve has been moved forwardly to space the flanges 31C beyond the inner end of the bosses 24C the torque sleeve is rotated to register the groove 35C with the boss 24C. Ears 26 overhang the flanges 31C to secure the cage together as a unit.

In the embodiment shown in FIG. 7, the tongues 23D contain an axially extending boss 24D and a radially extending boss 25D that extends completely across the distal end of the tongue. The flanges 31D of the torque sleeve contain a wide groove 34D located adjacent the frusto-conical section 32 of the torque sleeve. With the groove 34D registered with the bosses 25D, and the torque sleeve moved forwardly and rotated to bring the flanges 31D into registration with the clockwise side of the bosses 24D, the counterclockwise edges of the bosses will abut against the frusto-conical portions 32 of the torque sleeve. Engagement of the flanges 31D with the forward edge of the boss 25D secures the spring cage together as a unit and torque is transmitted in a clockwise direction, as seen in FIG. 7, by the engagement of the frusto-conical portions 32 with the counterclockwise edges of the bosses 24D and in a counterclockwise direction by the engagement of the flanges 31D with the clockwise edges of the bosses 24D.

In the embodiment shown in FIG. 8, the tongues 23E have inwardly extending flanges 27 positioned on both edges and the end of the tongue. The flanges 31E of the torque sleeve contain a wide groove 34E that is wide enough to permit the tongues and flanges to pass through it. After the torque sleeve has moved forwardly sufficiently to cause the flange 31E to clear the forward end of the side flanges 27 on the tongues, the torque sleeve is then rotated clockwise, as seen in FIG. 8, to register the flange 31E between the side portions of the flanges 27, thereby to provide driving torque in both directions of rotation and the tongues 31E engage the end portions of the flanges 27 to secure the spring cage together as a unit.

In the embodiment shown in FIG. 9, the tongues 23F are provided with inwardly extending flanges 28 that extend from end-to-end on the clockwise side of the tongues, and with shorter inwardly extending flanges 29 on the counterclockwise edges thereof. The flanges 31F of the torque sleeve contain spaced apart grooves 36 and 37 which are spaced to register with the flanges 28 and 29 respectively. After the torque sleeve has been moved forwardly to position the flange 31F forwardly of the flange 28, the torque sleeve is rotated clockwise, as seen in FIG. 9, to register the groove 37 with the flange 28, thereby to provide positive drive in both directions of rotation. Engagement of the flanges 31F with the forward ends of the shorter flanges 29 secures the spring cage together as a unit.

Each of the foregoing embodiments of the invention can be assembled without the use of tools, jigs or fixtures. In certain instances where the springs, such as 11, are stiffer, compressing of such springs sufficiently to permit the flanges of the torque sleeve to clear the forward ends of the bosses or flanges on the tongues may be difficult.

In FIG. 10, we have shown a further modification of our invention that is useful under these conditions. In this embodiment the tongues 23G are provided with inwardly extending bosses 24G and the flanges of the torque sleeve are equipped with grooves corresponding to grooves 35 adapted to register with the boss 24G. The radial flanges corresponding to flange 31 are shorter than in the other embodiments, and the frusto-conical portions 32 and outer radial flanges 33 of the torque sleeve are longer than in the other embodiment. When the torque sleeve is registered with the tongue and moved forwardly to register the bosses 24G with the grooves therein, ears 70 are bent out of the distal ends of the tongues 23G so that they overhang the radial flanges on the torque sleeve to secure the spring cage together as a unit. Positive drive in both directions is accomplished by the engagement of the frusto-conical flanges 32 with the edges of the tongues 23G.

In the embodiment of the invention shown in FIG. 11, the tongues 23H contain no inwardly extending bosses and the radial flanges on the torque sleeve are dimensioned to bring the edges of the frusto-conical portions into engagement with the edges of the tongues. After the torque sleeve has been moved forwardly sufficiently, ears 71 are bent out of the central portion of the distal ends of the tongues to overhang the radial flanges 31 of the torque sleeve to secure the spring cage together as a unit.

The embodiment shown in FIG. 12 is the same as that shown in FIG. 11, except that there is but a single ear 72 projecting inwardly from the distal ends of the tongues.

As explained above, the embodiments of the invention shown in FIGS. 1 to 9, inclusive, contain a spring cage that is assembled by moving the torque sleeve forwardly far enough to permit the flange thereon to pass around the forward end of the driving bosses in the tongues. The torque sleeve is then rotated to register these bosses with grooves in the flanges of the sleeve. Accidental unlocking of the torque sleeve from the spring cage in the completely assembled seal is prevented by dimensionsing the rearwardly extending portion 52 of the seal ring and the forwardly extending portion 44 of the bellows so that the adjacent ends of these members engage each other just before full travel of the cage with respect to the torque sleeve has been reached. Through this feature of the invention, accidental unlocking of the seal during or after installation in a machine is definitely prevented.

While we have included in the preferred embodiment of our invention but two tongues 23 extending rearwardly from the outer casing, it is contemplated that oftentimes it may be advantageous to provide a greater number of such tongues together with a correspondingly greater number of outer flanges on the torque sleeve. Also, in the preferred embodiment of the invention, we have shown and described the spring as a helical spring; however, the use of other forms of springs, including but not limited to finger springs and wave springs, in lieu of the helical spring shown, is contemplated within the teachings of the invention. These and other modifications of the device shown by way of example will be apparent to one skilled in the art, and we do not wish to be limited to the specific examples shown.

Having thus complied with the statutes and shown and described a preferred embodiment of our invention, what we consider new and desire to have protected by Letters Patent is pointed out in the appended claims.

What we claim is:

1. A face type seal comprising: an axially compressible spring cage consisting of a casing, a spring encircling said casing, a torque sleeve with which the spring is engaged, and interengaged means on the casing and sleeve, for holding the cage together as a unit with the spring partially compressed between the casing and sleeve, and for establishing a positive drive between the sleeve and casing;
    an elastomer diaphragm loosely fitted in the spring cage and consisting of an outer cylindrical portion, a flange extending radially outwardly from one end of said portion and disposed within the casing, an inner cylindrical portion disposed within and engaging the torque sleeve, and an annulus connecting together said cylindrical portions;
a seal ring fitted in said casing in seal forming engagement with said diaphragm and projecting forwardly from the casing;
    and interengaged means on said casing and seal ring for transmitting torque therebetween.

2. A face type seal as specified in claim 1, in which the casing comprises:
    an outer cylindrical wall,
    a radial wall projecting inwardly from the rear end of said outer wall, against which radial wall the spring abuts,
    an inner cylindrical wall projecting rearwardly from the inner edge of said radial wall;
    tongues projecting rearwardly from the distal end of said inner wall, and means projecting radially inwardly from said tongues with which means the torque sleeve is engaged to hold the spring cage together as a unit.

3. A face type seal as specified in claim 2, in which the seal ring contains:
    an outer cylindrical portion the radial rear face of which is in seal-forming engagement with the flange of the elastomer diaphragm, and
    an inner cylindrical portion extending rearwardly from said outer cylindrical portion and dimensioned for pressfit engagement with the outer cylindrical portion of the elastomer diaphragm thereby to retain the seal ring in the casing.

4. A face type seal as specified in claim 2, in which the torque sleeve comprises:
    a cylindrical portion,
    inner flanges extending radially outwardly and frusto-conical portions extending rearwardly and outwardly from the front end of said cylindrical portion, and
    outer flanges extending radially outwardly from the distal ends of said frusto conical portions.

5. A face type seal as specified in claim 4, in which the helical spring abuts against the outer flanges on the torque sleeve.

6. A face type seal as specified in claim 5, in which the interengaged means holding the spring cage together consists of the inner flanges of the torque sleeve and means at the distal ends of the tongues of the casing.

7. A face type seal as specified in claim 6, in which the means for establishing a positive drive between the sleeve and the casing consists of
  inwardly projecting bosses on the tongues, and
  grooves in the inner flanges of the torque sleeve into which said bosses project, which means permits axial movement between the casing and torque sleeve.

8. A face type seal as specified in claim 7, in which other means at the distal ends of the tongues engage the inner flanges of the torque sleeve adjacent said grooves to hold the spring cage together as a unitary structure.

9. A face type seal as specified in claim 8, in which the other means at the distal ends of the tongues consist of ears projecting out of the tongues and overhanging the inner flanges of the torque sleeve.

10. A face type seal as specified in claim 6,
  in which the ends of the outer flanges of the torque sleeve engage the edges of the tongue means of the casing to provide positive drive between the torque sleeve and casing in both directions of rotation, and
  in which the spring cage is held together by ears projecting out of the distal ends of the tongues and overhanging the inner flanges of the torque sleeve.

11. A face type seal as specified in claim 6, in which the means for establishing positive drive consists of
  an inturned flange projecting from end-to-end of one side of each tongue on the casing and
  slots in the inner flanges of the torque sleeve into which said flanges project.

12. A face type seal as specified in claim 11, in which the spring cage is held together by short inturned flanges on the distal ends of the other edges of the tongues, which tongue flanges overhang the inner flanges of the torque sleeve.

13. A face type seal as specified in claim 6,
  in which the means for establishing positive drive consists of inturned flanges extending from end-to-end of each side of each tongue and portions of the flanges of the torque sleeve which engage said flanges, and
  in which the spring cage is held together by the engagement of said flange portions with inturned flanges at the distal ends of the tongues, which latter flanges are a continuation of the drive flanges.

References Cited in the file of this patent

UNITED STATES PATENTS

| | | |
|---|---|---|
| 2,365,351 | Matter | Dec. 19, 1944 |
| 2,881,014 | Amirault | Apr. 7, 1959 |

FOREIGN PATENTS

| | | |
|---|---|---|
| 129,717 | Australia | Oct. 29, 1948 |